(12) United States Patent
Keller et al.

(10) Patent No.: US 7,706,682 B2
(45) Date of Patent: Apr. 27, 2010

(54) WIDE-ANGLE SLIP-ON VIEWFINDER ON RANGEFINDER CAMERAS FOR PHOTOGRAPHIC RECORDINGS WITH DIFFERENT FOCAL LENGTHS

(75) Inventors: Kathrin Keller, Lahnau (DE); Uwe Reinstädtler, Fernwald (DE)

(73) Assignee: Leica Camera AG, Solms (DE)

( * ) Notice: Subject to any disclaimer, the term of this patent is extended or adjusted under 35 U.S.C. 154(b) by 455 days.

(21) Appl. No.: 11/882,547

(22) Filed: Aug. 2, 2007

(65) Prior Publication Data

US 2008/0031613 A1 Feb. 7, 2008

(30) Foreign Application Priority Data

Aug. 4, 2006 (DE) .................. 10 2006 036 891
Sep. 25, 2006 (DE) .................. 10 2006 045 565

(51) Int. Cl.
*G03B 13/06* (2006.01)
*G02B 9/12* (2006.01)

(52) U.S. Cl. .................. 396/382; 396/384; 396/152; 359/716; 359/726; 359/738; 359/784; 359/788; 348/341

(58) Field of Classification Search .............. 359/716, 359/726, 738, 784, 788, 798, 800; 396/89, 396/94, 138, 139, 148, 149, 152, 373, 377–385; 348/341

See application file for complete search history.

(56) References Cited

U.S. PATENT DOCUMENTS

| 6,643,462 B2 | 5/2002 | Abe |
| 6,388,738 B1 | 11/2003 | Harand et al. |
| 6,674,473 B1 * | 1/2004 | Takada .................. 359/689 |
| 2004/0095503 A1 * | 5/2004 | Iwasawa et al. .......... 348/344 |

FOREIGN PATENT DOCUMENTS

| DE | 101 12 611 C1 | 5/2002 |
| DE | 100 10 443 B4 | 10/2004 |

* cited by examiner

*Primary Examiner*—Evelyn A. Lester
(74) *Attorney, Agent, or Firm*—Foley & Lardner LLP

(57) ABSTRACT

Described is a wide-angle slip-on viewfinder (1) on rangefinder cameras for analog and digital wide-angle recordings of different image recording formats with lenses of different focal lengths, comprising three lens groups (LG1, LG2, LG3), a frame/mask unit (10) and a partially transmissive prism cube (8) which is designed as a combination element, wherein, on the light entrance side (4) in the viewfinder beam path (9), a first lens group (LG1) has a negative refractive power and the second and third lens groups (LG2, LG3) have a positive refractive power, wherein the second lens group (LG2) is composed of a first lens (L3) arranged downstream of the first lens group (LG1) and a second lens (L4) arranged on the light exit side (7) and the partially transmissive prism cube (8) is arranged between the lenses (L3, L4) and the third lens group (LG3) is arranged in a mask imaging beam path (11) which is at right angles to the viewfinder beam path (9) between the frame/mask unit (10) and the partially transmissive prism cube (8).

9 Claims, 2 Drawing Sheets

WIDE-ANGLE SLIP-ON VIEWFINDER ON RANGEFINDER CAMERAS FOR PHOTOGRAPHIC RECORDINGS WITH DIFFERENT FOCAL LENGTHS

CROSS-REFERENCE TO RELATED PATENT APPLICATIONS

The right of foreign priority is claimed under 35 U.S.C. §119(a) based on Federal Republic of Germany Application No. 10 2006 036 891.6, filed Aug. 4, 2006, and Federal Republic of Germany Application No. 10 2006 045 565.7, filed Sep. 25, 2006, the entire contents of both applications, including the specifications, drawings, claims and abstracts, are incorporated herein by reference.

BACKGROUND OF THE INVENTION

The invention relates to a wide-angle slip-on viewfinder for analog and digital wide-angle photographs with lenses of different focal lengths on range finder cameras.

The design is similar to that of an optical rangefinder system, as is known for example from DE 100 10 443 B4, and is fitted in so-called rangefinder cameras.

Rangefinder cameras with interchangeable lenses of different focal lengths are usually equipped with a viewfinder system, integrated in the camera, of constant magnification, which system is optimized for a specific lens focal length. If lenses with longer or shorter focal lengths are used, image field delimitation frames, which correspond to the modified recording image field of the lens which was selected in each case or which are adapted to its focal length, of different size must be reflected into the viewfinder for accurate image field selection. The longer the focal length of the lens is, the smaller the recording image field becomes which can be displayed in the viewfinder. Accordingly, the recording image field becomes increasingly larger at shorter focal lengths and can no longer be displayed in the viewfinder as of a specific lens focal length. The constant magnification of the viewfinder system integrated in the rangefinder camera does not permit complete display of the recording image field, with the result that the user can no longer completely see the image field recorded by the lens in the viewfinder.

For this reason, variable viewfinders integrated in the camera with variable focal length are known, which match the image section in the viewfinder to the respective lens focal length. These integrated variable viewfinders are, however, elaborate and of complicated optical design and, on account of the confined installation conditions, often have a poor optical imaging performance. Mask frames for recording image field delimitation are not necessary in these variable viewfinder systems, because the field of view which can be seen in the viewfinder corresponds to the size of the recorded image.

Likewise known are specific viewfinders for wide-angle lenses, the image field of which is adapted to that of the respective lens, and which can be pushed via an adaptor into the hot shoe on the camera. The basic design of such systems, which are often known as Galilean viewfinders, constitutes an inverted Dutch telescope. They have a divergent lens on the object side. This lens simultaneously delimits the field of view and therefore frequently has a shape similar to the recording format. A convergent lens acts as an eyepiece. The field of view is a function of the ratio of the focal lengths of the two lenses.

Furthermore, a slip-on variable viewfinder for wide-angle recordings is known from DE 101 12 611 C1, which viewfinder, however, does not have mask frames for crisp image field delimitation.

Owing to their rigid connection to the camera, slip-on viewfinders have the disadvantage of mostly being suitable only for recordings as of a relatively large object distance, since the optical axes of the lens and of the slip-on viewfinder are arranged at a predetermined angle with respect to one another. Although it is ensured in this manner that the image section recorded by the camera at a relatively large object distance corresponds to the image section displayed in the slip-on viewfinder, parallax errors inevitably occur in the case of image recordings in the near field. The image selection in the slip-on viewfinder then no longer corresponds to the actual image recording of the camera.

The fact that the user must also undertake to set the distance, stop and exposure of the camera also with fitted slip-on viewfinder by looking into the viewfinder on the camera, results in particular design requirements for the slip-on viewfinder. Looking into the camera viewfinder is not to be impeded by the slip-on viewfinder. The distance when switching to or from looking into the slip-on viewfinder is not to be too large. The viewfinder magnification is to be as large as possible so as to be able to detect details effectively. This requires generally a large lens diameter in the front lens. In order to counteract a parallax error, the distance between the optical axes of the slip-on viewfinder and of the lens is to be as small as possible. On the other hand, high speed wide-angle lenses often have a large diameter, and this can impede the field of view of the slip-on viewfinder.

Because of these stipulations, to date only special slip-on viewfinders have been developed as Galilean viewfinders of very simple design for specific focal lengths for the image recording format of the miniature film. With an increase in the number of lenses, the user therefore faces the necessity of always having available an ever increasing number of slip-on viewfinders matching the focal lengths of the lenses used in each case. A mix up in the assignment cannot be ruled out when interchanging lenses and slip-on viewfinders and errors during the image recording are the result.

Increasingly, there has been a desire to use existing lenses on digital cameras. If the sensor size of the digital camera has an image recording format which deviates from the conventional miniature film, the image section displayed in the slip-on viewfinder no longer corresponds to the actual image recorded by the digital camera. If the digital camera has, for example, a sensor size which is smaller by a factor of 1.33 as compared to the miniature film format, a so-called focal length extension by a factor of 1.33 ensues. The slip-on viewfinders matching in each case for the image recording format of the conventional miniature film in this case display an image field which is too large by a factor of 1.33. The image field actually detected by the sensor area in the digital camera is smaller. Errors during the image selection and in the image composition ensue.

SUMMARY OF THE INVENTION

It was therefore an object of the invention to provide a universal wide-angle slip-on viewfinder with good optical imaging performance, which can be used for photographic recordings with rangefinder cameras of different recording image formats and together with a plurality of lenses of different focal lengths, has a sharp image field delimitation, is of compact size and can at the same time be produced cost-effectively. It was another object of the invention to achieve improved correspondence between the recorded image and the image field, displayed in the slip-on viewfinder, in the near field and to enable horizontal orientation of the camera.

This object is achieved in a wide-angle slip-on viewfinder as described herein.

In an advantageous manner, the wide-angle slip-on viewfinder has a first lens group of two lenses of negative refractive power, wherein the first lens is a hollow meniscus with a convex surface arranged on the light entrance side. In interaction with a second biconcave lens, which has an aspherical surface on the light entrance side, it is possible to correct the field errors of the entire system within a confined installation space.

A compact and cost-effective design is achieved in that the second lens group comprises a first planoconvex lens with positive refractive power and a second biconvex lens with positive refractive power. The planar surface of the first lens is cemented to the light-entrance-side surface of the partially transmissive prism cube arranged between the two lenses. A separate lens mount for the planoconcave first lens is thus not necessary.

On account of the arrangement of first lens group of total negative refractive power and second lens group of total positive refractive power, the viewfinder system is advantageously designed as an inverted Galilean telescope with fixed magnification. In this manner, a laterally correct and height-correct imaging of the object plane from infinity to infinity is possible with few optical elements.

In a further embodiment of the invention, the third lens group is designed as a cemented component made from a biconcave lens, which faces the frame/mask unit, of negative refractive power and a biconvex lens, which faces the partially transmissive prism cube, of positive refractive power. The cemented component is corrected with respect to its achromatism condition and is particularly suitable, in interaction with the second lens of the second lens group, for a true-color imaging of the image field delimitation frames produced by the frame/mask unit to infinity. A splitter layer is provided inside the partially transmissive prism cube for the superposition of the object plane, which is imaged to infinity on the light exit side by the first and second lens groups, with the image field delimitation frames.

In a particularly advantageous manner, a plurality of, preferably five, image field delimitation frames assigned to different lens focal lengths can be set using the frame/mask unit. The image field delimitation frames are designed with an outwardly curved shape which deviates from the rectangular shape of the image recording format for the compensation of distortions of the optical system composed of the third lens group and the second lens of the second lens group.

According to the invention, it is further possible with a suitable selection of the area ratios of the five image field delimitation frames with respect to one another to provide a universal viewfinder for six image recording situations. For example, if a digital camera has a sensor size which is smaller by a factor of 1.33 as compared to the miniature film format of an analog camera, it is advantageous if the area of the third image field delimitation frame corresponds to 1.33 times the first (and smallest) image field delimitation frame. In this manner, it is possible to use the universal viewfinder together with the same lens both on an analog rangefinder camera with miniature film format and on a digital camera. For example, if a lens has the miniature focal lengths f=16, 18 and 21 mm, the same lens can be used on a digital camera with an image sensor which is smaller by a factor of 1.33 as compared to the miniature film format using the image field delimitation frames f=21, 24 and 28.

For particularly simple horizontal orientation of the camera system with mounted wide-angle slip-on viewfinder, a mirror for imaging a circular level which is arranged at right angles to the optical axis of the viewfinder system above the mirror is provided in the lower region between partially transmissive prism cube and second lens of the second lens group. In this manner it is possible for the camera to be oriented horizontally with simultaneous observation of the image scene to be photographed.

Advantageously, downstream of the circular level, a diffusing screen composed of self-luminous material for the diffuse illumination of the circular level is arranged, which ensures a horizontal orientation even in the case of poor illumination conditions.

According to the invention, the frame/mask unit is mounted such that it can be displaced perpendicularly to the mask imaging beam path for the purposes of parallax compensation. In this manner, the position of the image field delimitation frames is displaced within the observable viewfinder field such that it is brought to match the image field actually recorded by the camera, even in the case of focussing in the near field. The parallax compensation takes place particularly effectively within the range of between 0.5 and 2 meters of object distance. The observable viewfinder field is dimensioned to be large enough that the mask frame field, which can be seen when looking through the eyepiece into the viewfinder, can be displaced downward from the top and thus at right angles to the horizon plane.

Further objects, features and advantages of the present invention will become apparent from the detailed description of preferred embodiments that follows, when considered together with the accompanying figures of drawing.

BRIEF DESCRIPTION OF THE DRAWINGS

In the drawing, an exemplary embodiment of the wide-angle slip-on viewfinder is illustrated schematically and is described in more detail below with reference to the figures, in which.

DETAILED DESCRIPTION OF THE PREFERRED EMBODIMENTS

Figure 1:
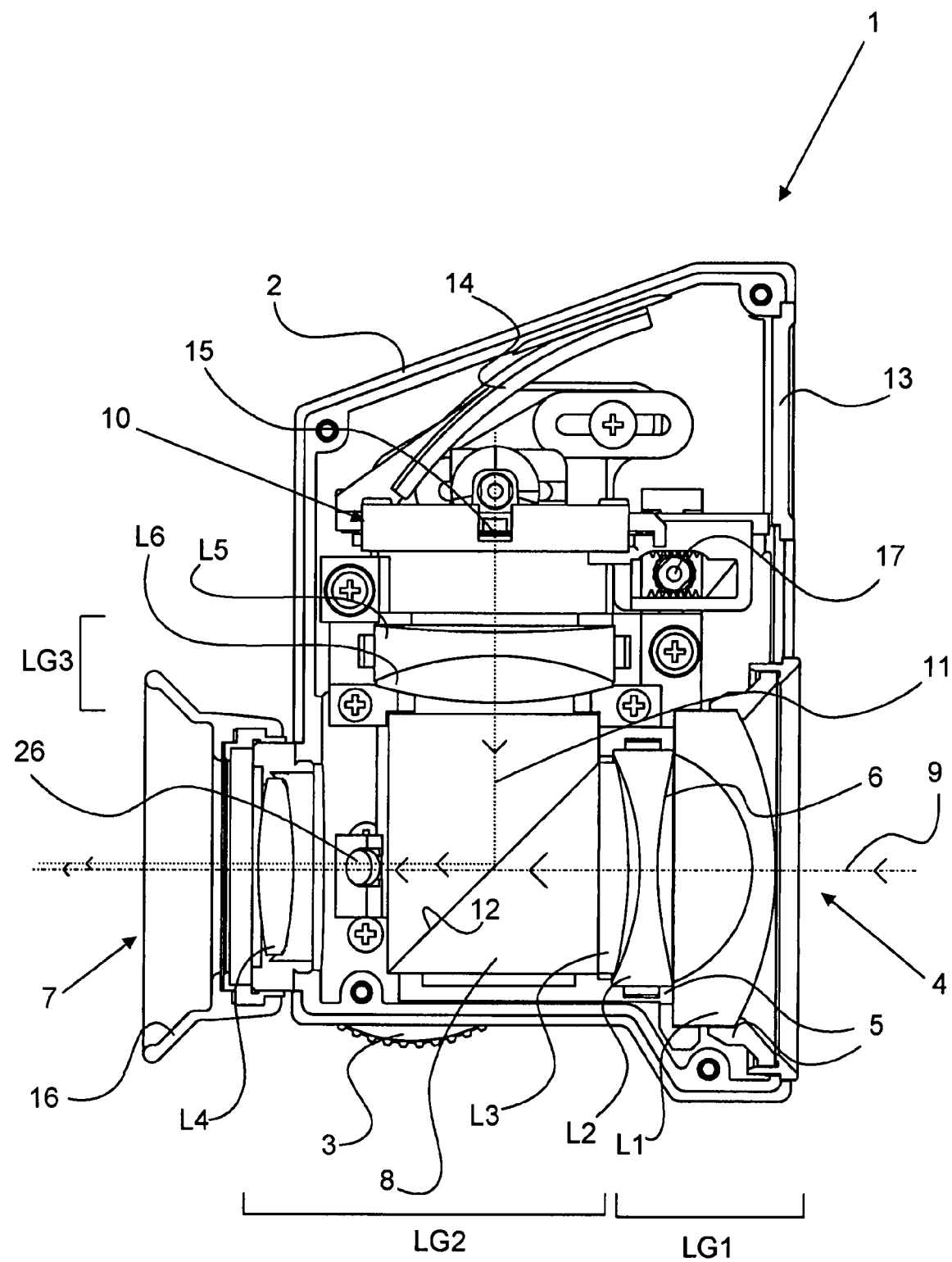
FIG. 1 shows a plan view of the wide-angle slip-on viewfinder without upper housing shell.

The wide-angle slip-on viewfinder 1 illustrated in FIG. 1 comprises a lower housing shell 2, which is inserted into the hot shoe of a camera using an adapter (not illustrated further), which is arranged below the lower housing shell 2, and can be secured using a knurled ring 3. In the lower housing shell 2, a first lens group LG1 is arranged in the front region 4 of the slip-on viewfinder. The first lens group LG1 comprises a first lens L1 and a second lens L2 of negative refractive power, which are inserted into mounting elements 5 of the lower housing shell 2. The second lens L2 has, on its side facing the front region 4, an aspherical surface 6.

The second lens group LG2 comprises a first lens L3 of positive refractive power and a second lens L4 of positive refractive power, which are arranged on the light exit side on the eyepiece side 7. A partially transmissive prism cube 8, onto whose side facing the front region 4 the first lens L3 of the second lens group LG2 is cemented, is located between the lenses L3, L4 of the second lens group LG2.

A mask imaging beam path 11, which is produced using a third lens group LG3 for imaging a frame/mask unit 10, is located at right angles to a viewfinder beam path 9, which is produced using the first lens group LG1 and the second lens group LG2.

A splitter layer 12 is arranged inside the partially transmissive prism cube 8 at an angle of 45° perpendicular to the viewfinder beam path 9 and mask imaging beam path 11.

The third lens group LG3 comprises a biconcave lens L5 of negative refractive power and a biconvex lens L6 of positive refractive power, which are joined together to form a cemented element.

Ambient light is injected into the slip-on viewfinder 1 via a diffusing screen 13 inserted into the lower housing shell 2 and is fed to the frame/mask unit 10 by a deflecting mirror 14. The image field delimitation frames 15 produced in the frame/mask unit 10 are injected into the partially transmissive prism cube 8 using the third lens group LG3, superposed with the viewfinder beam path 9 at the splitter layer 12 and imaged to infinity on the eyepiece side 7 with the aid of the second lens L4 of the second lens group LG2. An eyepiece cup 16 which can be turned over in the direction of the front region 4 for those wearing spectacles is arranged on the eyepiece side 7. In order to ensure the same light conditions for the superposition image produced from viewfinder beam path 9 and mask imaging beam path 11 with the aid of the partially transmissive prism cube 8, the diffusing screen 13 is oriented in the same direction as the first lens L1 of the first lens group LG1.

The frame/mask unit 10 is operated via a rotatable gear spindle 17 and in this manner produces different image field delimitation frames 15. A mirror 26 for reflecting in a circular level (not illustrated further) is arranged between the partially transmissive prism cube 8 and the second lens L4 of the second lens group LG2 in the lower region of the lower housing shell 2.

Figures 2A, 2B, 2C:
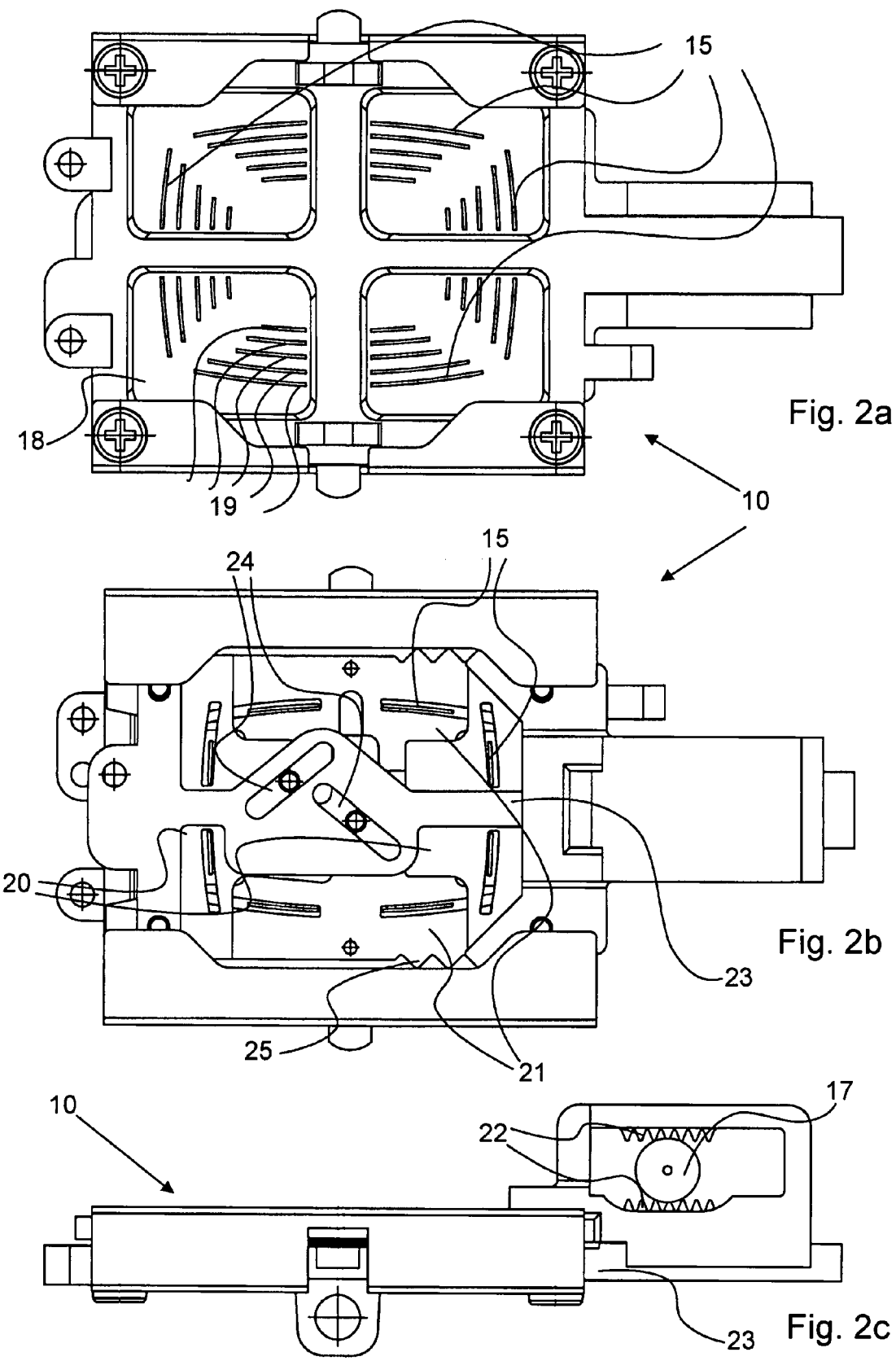
FIG. 2 shows the frame/mask unit in multiple views.

FIG. 2 shows the frame/mask unit 10 in several illustrations. FIG. 2a shows a reticle 18 having a plurality of light-transmissive frame markings 19 which, with the aid of the vertical covering masks 20 and horizontal covering masks 21 (illustrated in FIG. 2b), expose the image field delimitation frames 15 and cover the remaining frame markings 19. The mask operating slide 23 is set in a horizontal displacement motion using the gear spindle 17 (illustrated in FIG. 2c), which is rotatably mounted, and the toothing 22 and pushes, via a slotted pin guide 24, the horizontal covering masks 21 in the vertical direction and the vertical covering masks 20 in the horizontal direction toward one another. In the process, the mask operating slide 23 latches in five defined positions which all belong together and expose image field delimitation frame 15 on account of the latching lugs 25.

The foregoing description of preferred embodiments of the invention has been presented for purposes of illustration and description only. It is not intended to be exhaustive or to limit the invention to the precise form disclosed, and modifications and variations are possible and/or would be apparent in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto and that the claims encompass all embodiments of the invention, including the disclosed embodiments and their equivalents.

LIST OF REFERENCE SYMBOLS

1 Wide-angle slip-on viewfinder
2 Lower housing shell
3 Knurled ring
4 Front region of the slip-on viewfinder
5 Mounting elements
6 Aspherical surface
7 Eyepiece side
8 Partially transmissive prism cube
9 Viewfinder beam path
10 Frame/mask unit
11 Mask imaging beam path
12 Splitter layer
13 Diffusing screen
14 Deflecting mirror
15 Image field delimitation frame
16 Eyepiece cup
17 Gear spindle
18 Reticle
19 Frame markings
20 Vertical covering masks
21 Horizontal covering masks
22 Toothing
23 Mask operating slide
24 Slotted pin guide
25 Latching lugs
26 Mirrors
LG1 First lens group
LG2 Second lens group
LG3 Third lens group
L1 Hollow meniscus of negative refractive power
L2 Biconcave lens of negative refractive power
L3 Planoconvex lens of positive refractive power
L4 Biconvex lens of positive refractive power
L5 Cemented component lens of negative refractive power
L6 Cemented component lens of positive refractive power

What is claimed is:

1. A wide-angle slip-on viewfinder for rangefinder cameras for analog and digital wide-angle recordings of different image recording formats with lenses of different focal lengths, comprising three lens groups, a frame/mask unit and a partially transmissive prism cube which comprises a combination element, wherein the first lens group arranged on the light entrance side in a viewfinder beam path has a negative refractive power and comprises two lenses of negative refractive power, wherein the first lens comprises a hollow meniscus with a convex surface arranged on the light entrance side and the second lens is a biconcave lens with an aspherical surface arranged on the light entrance side, the second and third lens groups have positive refractive power, wherein the second lens group comprises a first planoconvex lens, arranged downstream of the first lens group, with positive refractive power and a second biconvex lens with positive refractive power, the partially transmissive prism cube is arranged between the lenses and a planar surface of the first lens is cemented to the light-entrance-side surface of the partially transmissive prism cube, the third lens group is arranged in a mask imaging beam path which is at right angles to the viewfinder beam path between the frame/mask unit and the partially transmissive prism cube, a plurality of image field delimitation frames assigned to different lens focal lengths set by the frame/mask unit, wherein the image field delimitation frames have an outwardly curved shape which deviates from a rectangular shape of the image recording format for the compensation of distortions of the optical system of the third lens group and second lens of the second lens group, and the area ratio of a third to a first and smallest image field delimitation frame corresponds to the area ratio between an analog and digital image recording format.

2. The wide-angle slip-on viewfinder as claimed in claim 1, wherein the arrangement of the first lens group of total negative refractive power and second lens group of total positive refractive power comprises an inverted Galilean telescope with fixed magnification and laterally correct and height-correct imaging of an object plane from infinity to infinity.

3. The wide-angle slip-on viewfinder as claimed in claim 1, wherein the third lens group comprises a cemented component made from a lens, which faces the frame/mask unit, of negative refractive power and a lens, which faces the partially transmissive prism cube, of positive refractive power and is corrected with respect to its achromatism condition.

4. The wide-angle slip-on viewfinder as claimed in claim 1, wherein the third lens group, in interaction with the second lens of the second lens group and the partially transmissive prism cube, superimposes an image field delimitation frame, produced by the frame/mask unit, on the image of an object plane owing to the first and second lens group and images it, on the light exit side, to infinity.

5. The wide-angle slip-on viewfinder as claimed in claim 1, wherein, in a lower region between the partially transmissive prism cube and second lens of the second lens group, a mirror for imaging a circular level which is arranged at right angles to the optical axis of the viewfinder system above the mirror is provided.

6. The wide-angle slip-on viewfinder as claimed in claim 5, wherein downstream of the circular level, a diffusing screen composed of self-luminous material for diffuse illumination of the circular level is arranged.

7. The wide-angle slip-on viewfinder as claimed in claim 1, wherein the frame/mask unit is mounted such that it can be displaced perpendicularly to the mask imaging beam path for the purposes of parallax compensation.

8. The wide-angle slip-on viewfinder as claimed in claim 1, wherein, for the backward illumination of the frame/mask unit, a diffusing screen, which is inserted into a housing shell of the slip-on viewfinder and is oriented at right angles to the viewfinder beam path, is provided, the diffusing screen being located upstream of a concave deflecting mirror deflecting illumination beams into a mask imaging beam path.

9. The wide-angle slip-on viewfinder as claimed in claim 1, comprising five image field delimitation frames.

\* \* \* \* \*